(12) United States Patent
Kushnirov et al.

(10) Patent No.: US 12,439,993 B2
(45) Date of Patent: Oct. 14, 2025

(54) FASTENING DEVICE, COMBINATION OF FASTENING DEVICE, FUNCTIONAL UNIT AND RECEIVING UNIT, AND COMBINATION OF A HEAD-PROTECTIVE GEAR WITH SUCH A FASTENING DEVICE

(71) Applicant: Cardo Systems, Ltd., Ra'anana (IL)

(72) Inventors: Avram Kushnirov, Barkan (IL); Dov Brecher, Givat Shmuel (IL); Boaz Levi, Binyamina (IL); Shmuel Debby, Hod Hasharon (IL)

(73) Assignee: Cardo Systems, Ltd., Ra'anana (IL)

( * ) Notice: Subject to any disclaimer, the term of this patent is extended or adjusted under 35 U.S.C. 154(b) by 176 days.

(21) Appl. No.: 18/035,605

(22) PCT Filed: Nov. 4, 2021

(86) PCT No.: PCT/IB2021/060221
§ 371 (c)(1),
(2) Date: May 5, 2023

(87) PCT Pub. No.: WO2022/097063
PCT Pub. Date: May 12, 2022

(65) Prior Publication Data
US 2023/0404200 A1 Dec. 21, 2023

(30) Foreign Application Priority Data
Nov. 5, 2020 (WO) ............... PCT/IB2020/060404

(51) Int. Cl.
*A42B 3/08* (2006.01)
*A42B 3/30* (2006.01)
*F16B 1/00* (2006.01)

(52) U.S. Cl.
CPC ............... *A42B 3/30* (2013.01); *A42B 3/08* (2013.01); *F16B 1/00* (2013.01); *F16B 2200/83* (2023.08)

(58) Field of Classification Search
CPC .......... A42B 3/08; A42B 3/147; A42B 1/0175
See application file for complete search history.

(56) References Cited

U.S. PATENT DOCUMENTS

| 4,521,831 A | 6/1985 | Thayer |
| 5,914,816 A | 6/1999 | Soto et al. |

(Continued)

FOREIGN PATENT DOCUMENTS

| CN | 104853636 A | 8/2015 |
| CN | 106953657 A | 7/2017 |

(Continued)

OTHER PUBLICATIONS

International Application No. PCT/IB2021/060221, "International Search Report and Written Opinion", Jan. 19, 2022, 13 pages.

(Continued)

*Primary Examiner* — Tajash D Patel
(74) *Attorney, Agent, or Firm* — Kilpatrick Townsend & Stockton LLP (57) ABSTRACT

A fastening device for releasably fastening a functional unit in a connection direction to a receiving unit. The fastening device comprises a functional unit comprising a functional unit abutment surface and a receiving unit comprising a receiving unit abutment surface. The functional unit abutment surface and the receiving unit abutment surface are configured to abut against each other in a connected state. The fastening device comprises at least one pair of magnets comprising at least one functional unit magnet allocated at or within a proximity to the functional unit abutment surface and at least one receiving unit magnet allocated at or within (Continued)

the proximity to the receiving unit abutment surface. The at least one functional unit magnet and the at least one receiving unit magnet exert an attractive force to each other.

22 Claims, 4 Drawing Sheets

(56) References Cited

U.S. PATENT DOCUMENTS

| | | | |
|---|---|---|---|
| 6,457,838 | B1 | 10/2002 | Dugmore et al. |
| 6,751,810 | B1 | 6/2004 | Prendergast |
| 7,264,368 | B2 | 9/2007 | Sherring |
| 8,056,152 | B2 | 11/2011 | Brace |
| 8,371,707 | B2 | 2/2013 | Uzar |
| 8,908,389 | B2 | 12/2014 | Teetzel et al. |
| 9,507,245 | B1 | 11/2016 | Druker et al. |
| 9,756,930 | B2 | 9/2017 | Hanchett et al. |
| 9,829,772 | B2 | 11/2017 | Harrison et al. |
| 10,021,931 | B2 | 7/2018 | Tulley |
| 10,028,543 | B2 | 7/2018 | Munns |
| 10,271,601 | B2 | 4/2019 | Chang |
| 10,492,559 | B1 | 12/2019 | Kele et al. |
| 11,129,431 | B2 | 9/2021 | Whitesell et al. |
| 11,484,086 | B2 | 11/2022 | Kushnirov |
| 12,048,344 | B2 * | 7/2024 | Kushnirov ............... A42B 3/04 |
| 12,102,163 | B2 | 10/2024 | Kushnirov |
| 12,349,758 | B2 | 7/2025 | Kushnirov |
| 2006/0133068 | A1 | 6/2006 | Sherring |
| 2006/0150304 | A1 * | 7/2006 | Bentz ....................... A42B 3/08 2/421 |
| 2010/0263110 | A1 * | 10/2010 | Berry .................. A42B 3/0473 2/459 |
| 2011/0145981 | A1 | 6/2011 | Teetzel et al. |
| 2012/0002046 | A1 | 1/2012 | Rapoport et al. |
| 2012/0320569 | A1 | 12/2012 | Lu |
| 2014/0020159 | A1 | 1/2014 | Teetzel et al. |
| 2014/0173811 | A1 | 6/2014 | Finiel et al. |
| 2014/0245523 | A1 | 9/2014 | Teetzel et al. |
| 2014/0317890 | A1 | 10/2014 | Koons et al. |
| 2015/0286117 | A1 | 10/2015 | Sung et al. |
| 2015/0338659 | A1 | 11/2015 | Gallery et al. |
| 2016/0174647 | A1 | 6/2016 | Benton |
| 2017/0059967 | A1 | 3/2017 | Harrison et al. |
| 2017/0341871 | A1 | 11/2017 | Peters |
| 2020/0170329 | A1 | 6/2020 | Bohn et al. |
| 2020/0383417 | A1 | 12/2020 | Bohn et al. |
| 2022/0057173 | A1 | 2/2022 | Jacobson |
| 2022/0218064 | A1 * | 7/2022 | Kushnirov ............... A42B 3/08 |

FOREIGN PATENT DOCUMENTS

| | | | |
|---|---|---|---|
| CN | 110892591 A | 3/2020 | |
| EP | 3753438 A1 * | 12/2020 | ........... A44B 11/005 |
| EP | 3942961 A2 | 1/2022 | |
| FR | 2978904 A1 | 2/2013 | |
| JP | 2020037760 A | 3/2020 | |
| WO | 2012100061 A1 | 7/2012 | |
| WO | 2017003930 A1 | 1/2017 | |
| WO | 2021108922 A1 | 6/2021 | |
| WO | WO-2024063180 A1 * | 3/2024 | ............... A42B 3/08 |

OTHER PUBLICATIONS

U.S. Appl. No. 18/486,829, "Supplemental Notice of Allowability", Jun. 25, 2024, 2 pages.
U.S. Appl. No. 18/486,829, Notice of Allowance mailed Feb. 16, 2024, 6 pages.
U.S. Appl. No. 18/486,829 , "Non-Final Office Action", Dec. 18, 2023, 7 pages.
Chinese Application No. Application No. 202411125616.1 , Office Action, Mailed On Feb. 14, 2025, 19 pages.
Japanese Application No. 2023-527094 , Office Action, Mailed on Feb. 4, 2025, 8 pages.
U.S. Appl. No. 19/051,778, Notice of Allowance mailed on Apr. 9, 2025, 8 pages.
European Application No. 23157694.3, Office Action mailed on Apr. 1, 2025, 5 pages.
U.S. Appl. No. 17/675,425, "Corrected Notice of Allowability", Jul. 15, 2022, 2 pages.
U.S. Appl. No. 17/675,425, "Corrected Notice of Allowability", Aug. 2, 2022, 4 pages.
U.S. Appl. No. 17/675,425, Notice of Allowance, Mailed on Jun. 29, 2022, 8 pages.
U.S. Appl. No. 17/955,236, Final Office Action, Mailed on Mar. 20, 2023, 13 pages.
U.S. Appl. No. 17/955,236, Final Office Action, Mailed on Jan. 23, 2024, 14 pages.
U.S. Appl. No. 17/955,236, Non-Final Office Action, Mailed on Jul. 10, 2023, 14 pages.
U.S. Appl. No. 17/955,236, Non-Final Office Action, Mailed on Dec. 6, 2022, 9 pages.
U.S. Appl. No. 17/955,236, Notice of Allowance, Mailed on Aug. 14, 2024, 9 pages.
U.S. Appl. No. 19/051,778, "Supplemental Notice of Allowability", Apr. 23, 2025, 2 pages.
International Application No. PCT/IB2020/060404, International Search Report and Written Opinion, Mailed on Jul. 12, 2021, 12 pages.

* cited by examiner

FASTENING DEVICE, COMBINATION OF FASTENING DEVICE, FUNCTIONAL UNIT AND RECEIVING UNIT, AND COMBINATION OF A HEAD-PROTECTIVE GEAR WITH SUCH A FASTENING DEVICE

CROSS REFERENCE TO RELATED APPLICATION

This application is a U.S. national phase of International Patent Application No. PCT/IB2021/060221, filed on Nov. 4, 2021, which claims priority to International Patent Application No. PCT/IB2020/060404, filed on Nov. 5, 2020. The full disclosure of each of the above-referenced priority applications is incorporated herein by reference in its entirety.

SUMMARY

The invention relates to a fastening device for releasably fastening a functional unit in a connection direction to a receiving unit, said functional unit and said receiving unit each having a longitudinal direction, a transverse direction and a height direction, said functional unit further having a functional unit abutment surface, and said receiving unit further having a receiving unit abutment surface, said functional unit abutment surface and said receiving unit abutment surface being adapted for abutting against each other in the connected state.

It should be noted already at this point that a communication unit may be an example of a functional unit used in the context of the present invention. A further example may be a camera unit. A still further example may be any sensor relevant for a smart helmet, e.g. a crash detection sensor. A still further example may be an acoustic unit, such as an outside speaker, including the possibility to transfer audio via vibrations, or microphones for anti-noise cancellation. Furthermore, the functional unit may include a combination of a plurality of the afore-mentioned units and/or sensors. In addition, it should be noted that the function does not necessarily have to be a technical function. Rather, the functional unit may serve a non-technical function as well, e.g. an aesthetic function.

A fastening device of the afore-mentioned type is, for example, known from WO 2012/100061 A1.

In view of WO 2012/100061 A1, it is the object of the present invention to propose a fastening device providing a reliable fastening of the functional unit to the receiving unit.

According to the present invention, this object is achieved by a fastening device of the afore-mentioned type in which said fastening device further comprises at least one pair of magnets, at least one functional unit magnet being allocated at or close to the functional unit abutment surface, and at least one receiving unit magnet being allocated at or close to the receiving unit abutment surface, said magnets of said at least one pair of magnets exerting an attractive force to each other.

It should be noted that at least one functional unit magnet and at least one receiving unit magnet together constitute one pair of magnets of said at least one pair of magnets.

According to an embodiment, the height direction of said functional unit and said receiving unit in a connected state of said functional unit and said receiving unit preferably may extend substantially parallel to the connection direction.

Magnets do not only provide very strong attractive forces when they are located close to each other, e.g. merely separated by a thin sheet of housing material, but also attractive forces of considerable strength when they are still separated from each other. Thus, the use of at least one pair of magnets assists the user when approaching the functional unit to the receiving unit in reliably finding the correct relative positioning of functional unit and receiving unit, as the magnets attract each other and thus pull the functional unit to the correct place relative to the receiving unit. In other words, the magnets provide a self-centering effect. This self-centering effect will reliably connect the functional unit and the receiving unit, even if the functional unit is released at a certain distance from the receiving unit, e.g. because the user wears gloves (it is easier putting the units close to each other rather than an accurate fitting with the fingers) and/or because the user wearing a head protective gear cannot see the units, so she/he only needs to hold the units close to one another. Furthermore, the strong attractive forces reliably hold the functional unit attached to the receiving unit when the functional unit and the receiving unit are in their connected state. In other words, the magnets support the reliable fastening in a two-fold way.

In order to achieve strong attractive forces at least one of the functional unit magnet and the receiving unit magnet may be an active magnet, e.g. a permanent magnet or an electromagnet. Active magnets, in contrast to passive magnets, emit a magnetic field even when not being influenced by an external magnetic field. According to an embodiment, a rear earth magnet, preferably a Samarium-Cobalt magnet, more preferably a Neodym-Samarium-Cobalt magnet may, for example, be used as a permanent magnet.

Although it is preferred, in particular in view of the strength of the magnetic forces, to have two active magnets, in particular two permanent magnets, it might be conceivable, in particular in order to reduce the costs of the magnetic fastening device, that one of the functional unit magnet and the receiving unit magnet is constituted by a passive magnet, e.g. an element at least partly made from a ferromagnetic or ferrimagnetic material and magnetized by the respective other magnet. Passive magnets emit a magnetic field only when being magnetized by an active magnet.

In order to further improve the self-centering effect, and thus the reliable fastening of functional unit and receiving unit, the positions of the at least one functional unit magnet and of the at least one receiving unit magnet in the connected state when viewed in the connection direction may be at least partially overlapping, preferably substantially aligned to each other.

For example, at least one functional unit magnet and/or at least one receiving unit magnet may be arranged in an allocated reception provided, e.g. integrally formed, in the respectively allocated unit, namely functional unit or receiving unit.

In case the functional unit comprises a housing and a functional device received in the housing, it is advantageous that the fastening device comprises at least two pairs of magnets, both being located outside the functional device, in order to reduce the magnets' effect on the electrical components of the functional device, in particular the capacitors thereof, and, in case of the functional device including a communication device, the RF antenna(s) thereof. In order to minimize any detrimental effect it is furthermore preferred that the at least two pairs of magnets are, when viewed in the longitudinal direction or the transverse direction, preferably the longitudinal direction, at opposite sides of the functional device.

Furthermore, at least one of said functional unit and said receiving unit may have a housing comprising a base part including at least a portion of said abutment surface and a cover part attached to the base part.

In order to further facilitate the correct positioning of the functional unit relative to the receiving unit, and thus enhance the self-centering effect, the functional unit abutment surface may comprise at least one inclined functional unit abutment surface portion and the receiving unit abutment surface may comprise at least one inclined receiving unit abutment surface portion being, in the connected state of the functional unit and the receiving unit, at least partially aligned to said at least one inclined functional unit abutment surface portion.

Preferably, the at least one inclined functional unit abutment surface portion and the at least one inclined receiving unit abutment surface portion may extend at substantially the same inclination angle with respect to the connection direction. Furthermore, the inclination angle may amount to at least 45°.

It is, of course, conceivable to provide a plurality of inclined functional unit abutment surface portions and/or inclined receiving unit abutment surface portions differing from each other regarding their inclination, e.g. direction of the inclination and/or inclination angle. It is, however, also possible that the at least one inclined functional unit abutment surface portion extends over at least a part of the, preferably around the entire, circumference of the functional unit and/or that the at least one inclined receiving unit abutment surface portion extends over at least a part of the, preferably around the entire, circumference of the receiving unit.

In order to prevent an unintentional detachment of the functional unit from the receiving unit, it is advantageous, if the fastening device further comprises at least one mechanical locking unit comprising a functional unit locking element allocated to the functional unit and a receiving unit locking element allocated to the receiving unit, said locking elements being adapted and intended to cooperate with each other.

According to a further embodiment, at each lateral side of the functional unit and the receiving unit at least one mechanical locking unit may be provided. In this context, the two lateral sides are those sides of the functional unit and the receiving unit opposing each other in the transverse direction.

If the at least one mechanical locking unit is designed as a snap-lock unit, comprising at least one catch element and at least one trap element, adapted and intended to cooperate with each other, the mechanical locking may be automatically established when approaching the functional unit to the receiving unit.

For example, the at least one trap element may be provided with a trap sliding surface and the at least one catch element may be provided with a catch sliding surface, said trap sliding surface and said catch sliding surface when sliding along each other elastically deflecting a catch end of the catch element to a locking preparation position. As soon as the catch sliding surface gets out of contact with the trap sliding surface, the catch end of the catch element automatically returns to its undeflected position and engages into a trap recess of the trap element, thus locking the functional unit to the receiving unit.

For example, the at least one catch element may comprise a resilient web connecting the catch end to the respectively allocated unit, i.e. the receiving unit or the functional unit, preferably the receiving unit.

In order to prevent the resilient web from plastic deformation or even breaking due to overbending, it is further suggested that a backing wall element extending substantially parallel to the resilient web may be provided at a predetermined distance from the connection of the resilient web to the respectively allocated unit, i.e. the receiving unit or the functional unit, preferably the receiving unit. Thus, it is safeguarded that the resilient web may be deformed only elastically. The backing wall element may extend at least over the same height in the connection direction as the at least one catch element.

In order to prevent the user from unintentionally unlocking the mechanical locking unit, the functional unit may extend externally beyond the at least one catch element. In this way, the user's fingers are not able to reach and operate the at least one catch element.

In order to enable the functional unit to be detached from the receiving unit, the fastening device may further comprise a securing element, said securing element being transferable between a securing position and a releasing position, said securing element being adapted to prevent in its securing position a movement of the functional unit relative to the receiving unit in a detaching direction, while allowing such movement in its releasing position. If the deflection direction of the catch end of the at least one catch element extends substantially parallel to a first direction, namely the transverse direction or the longitudinal direction, preferably the transverse direction, the detaching direction extends substantially parallel to a second direction, namely the longitudinal direction or the transverse direction, preferably the longitudinal direction, i.e. substantially orthogonal to both, the deflection direction and the connection direction.

Thus, in order to detach the functional unit from the receiving unit, the user first has to transfer the securing element from its securing position to its releasing position, e.g. by using a finger, for example the thumb, of one of his/her hands, and then push the functional unit in the detaching direction, e.g. by using the other fingers of his/her respective hand.

According to an advantageous embodiment, the securing element may be provided at, preferably integrally formed with, its allocated unit, namely the receiving unit or the functional unit, preferably the receiving unit.

Furthermore, the securing element may be formed in a U-shape. Said U-shape may, for example, include two side webs and a connecting web connecting the side webs. Said connecting web may extend substantially parallel to the first direction, while said side webs extend substantially parallel to the second direction. The transferability of the securing element between the securing position and the releasing position may be provided by the resiliency of the material of the securing element, in particular the resiliency of the material of the side webs.

In order to prevent the securing element from plastic deformation or even breaking due to overbending, it is further suggested that the fastening device may further comprise first movement limiting means adapted to prevent the securing element from being moved beyond the securing position and/or second movement limiting means adapted to prevent the securing element from being moved beyond the releasing position. Thus, it is safeguarded that the securing element may be deformed only elastically.

At least one of the first movement limiting means and the second movement limiting means may include a movement limiting abutment surface provided at the securing element and a cooperating further movement limiting abutment surface provided at the respectively allocated unit, namely the receiving unit or the functional unit, preferably the receiving unit.

According to a further embodiment of the invention the fastening device may further comprise a stopper surface provided at the receiving unit and a stopper counter-surface provided at the functional unit adapted and intended to cooperate with the stopper surface in order to limit a movement of the functional unit relative to the receiving unit in a direction opposite to the detaching direction.

Preferably, at least one of the stopper surface and the stopper counter-surface may extend substantially orthogonal to the detaching direction. The cooperation of the stopper surface and the stopper counter-surface may be, for example, advantageous in order to protect at least one pair of electrical contacts provided at the functional unit, on the one hand, and on the receiving unit, on the other hand, from excessive mechanical load when fastening the functional unit to the receiving unit. Said at least one pair of electrical contacts may be adapted to establish an electrical connection between at least one functional component connected to the receiving unit, e.g. at least one microphone and/or at least one loudspeaker, and at least one functional component included in the functional unit, e.g. at least one communication device and/or at least one manually operable element.

According to a preferred embodiment, said functional unit may include a communication device, for example a communication device using Bluetooth® technology.

Furthermore, said receiving unit may be part of a head protection gear or formed as a separate unit operatively fixable to said head protection gear. It should be noted that the head protective gear generally may be of any design. In particular, the head protective gear may include a hard shell or a soft shell. As head protective gears including a hard shell, motorcycle helmet, sports helmets, professional protective helmets, e.g. helmets worn by fire fighters, law enforcement forces, soldiers, pilots of aircrafts and/or helicopters and the like, are known. These helmets may be of different design. In particular, the helmet may be a full helmet, a cross helmet, a flip-up helmet, a jet helmet, a brain cap and the like. Head protective gears including a soft shell, for example, are used in martial arts, e.g. boxing, kickboxing and the like.

According to a further aspect, the invention further relates to a combination of a head protective gear and a fastening unit of the afore-discussed design.

BRIEF DESCRIPTION OF THE DRAWINGS

The invention will be described in more detail with respect to a specific embodiment referring to the enclosed drawings, in which.

DETAILED DESCRIPTION

Figure 1:
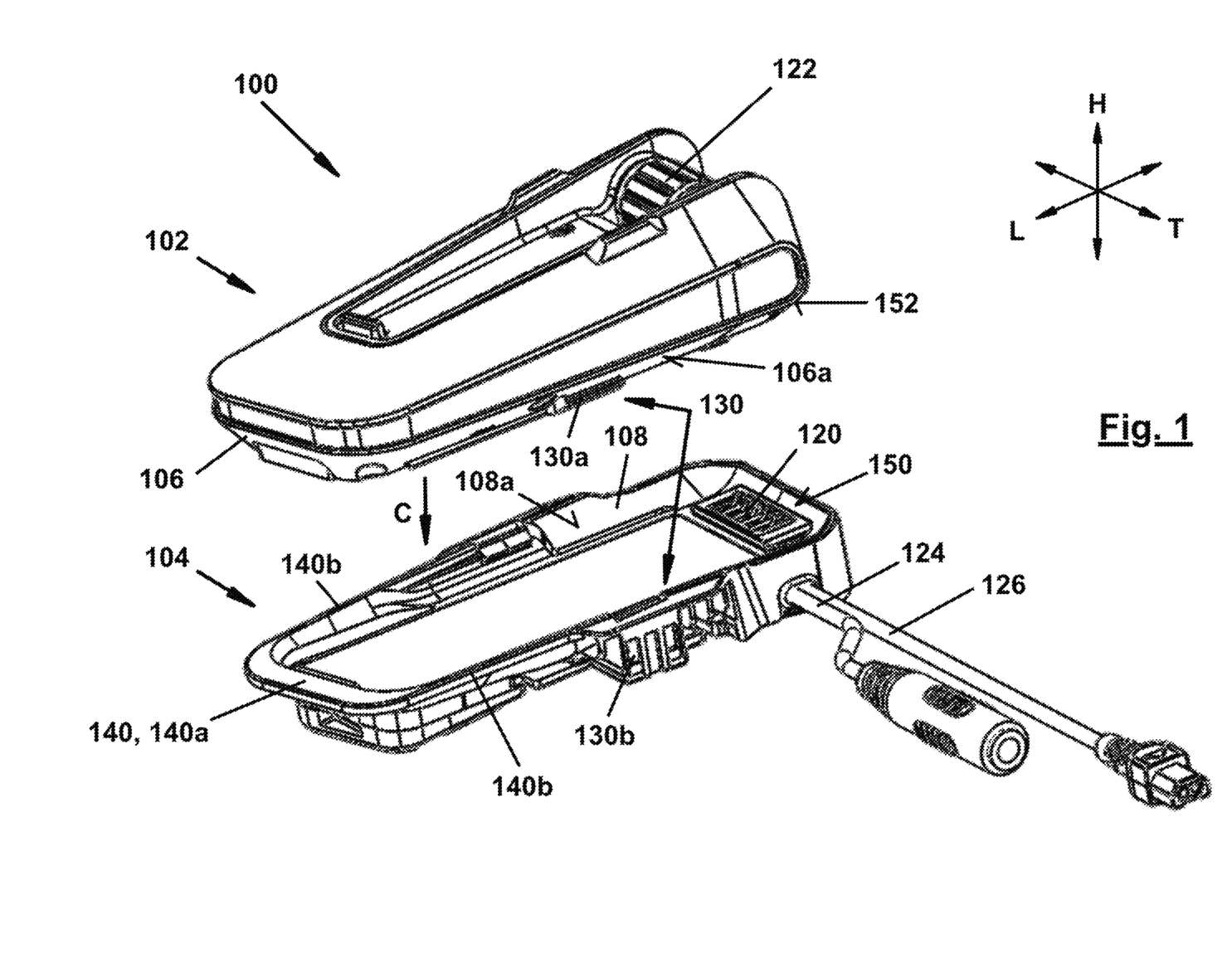
FIG. 1 shows a fastening device in a detached state according to an embodiment of the invention.

In FIG. 1, a fastening device is generally denoted by reference numeral 100. The fastening device 100 is adapted and intended to releasably fasten a functional unit 102 to a receiving unit 104. Both, the functional unit 102 and the receiving unit 104, are three-dimensional bodies extending in a longitudinal direction L, a transverse direction T and a height direction H.

In order to fasten the functional unit 102 to the receiving unit 104, the functional unit 102 is approached to the receiving unit 104 in a connection direction C extending substantially parallel to the height direction H.

The functional unit 102 has a functional unit abutment surface 106 and the receiving unit 104 has a receiving unit abutment surface 108. In a connected state of the functional unit 102 and the receiving unit 104, the functional unit abutment surface 106 and the receiving unit abutment surface 108 are abutting against each other and are aligned to each other. While FIG. 1 shows the functional unit 102 and the receiving unit 104 separated from each other, in other words in a detached state, FIG. 2 shows a cross-sectional view of the functional unit 102 and the receiving unit 104 in a connected state.

In addition to the functional unit abutment surface 106 and the receiving unit abutments surface 108, the fastening device 100 comprises at least one pair of magnets 110. Said at least one pair of magnets 110 comprises at least one functional unit magnet 112 allocated to the functional unit 102 and at least one receiving unit magnet 114 allocated to the receiving unit 104. In the connected state of the fastening device 100 shown in FIG. 2, the positions of the at least one receiving unit magnet 114 and the at least one functional unit magnet 112 are substantially aligned to each other in a plane extending substantially parallel to the longitudinal direction L and the transverse direction T. The at least one functional unit magnet 112 is located in a functional unit recess 116 provided in the functional unit 102 close to the functional unit abutment surface 106, and the at least one receiving unit magnet 114 is located in a receiving unit recess 118 provided in the receiving unit 104 close to the receiving unit abutment surface 108.

Figure 2:
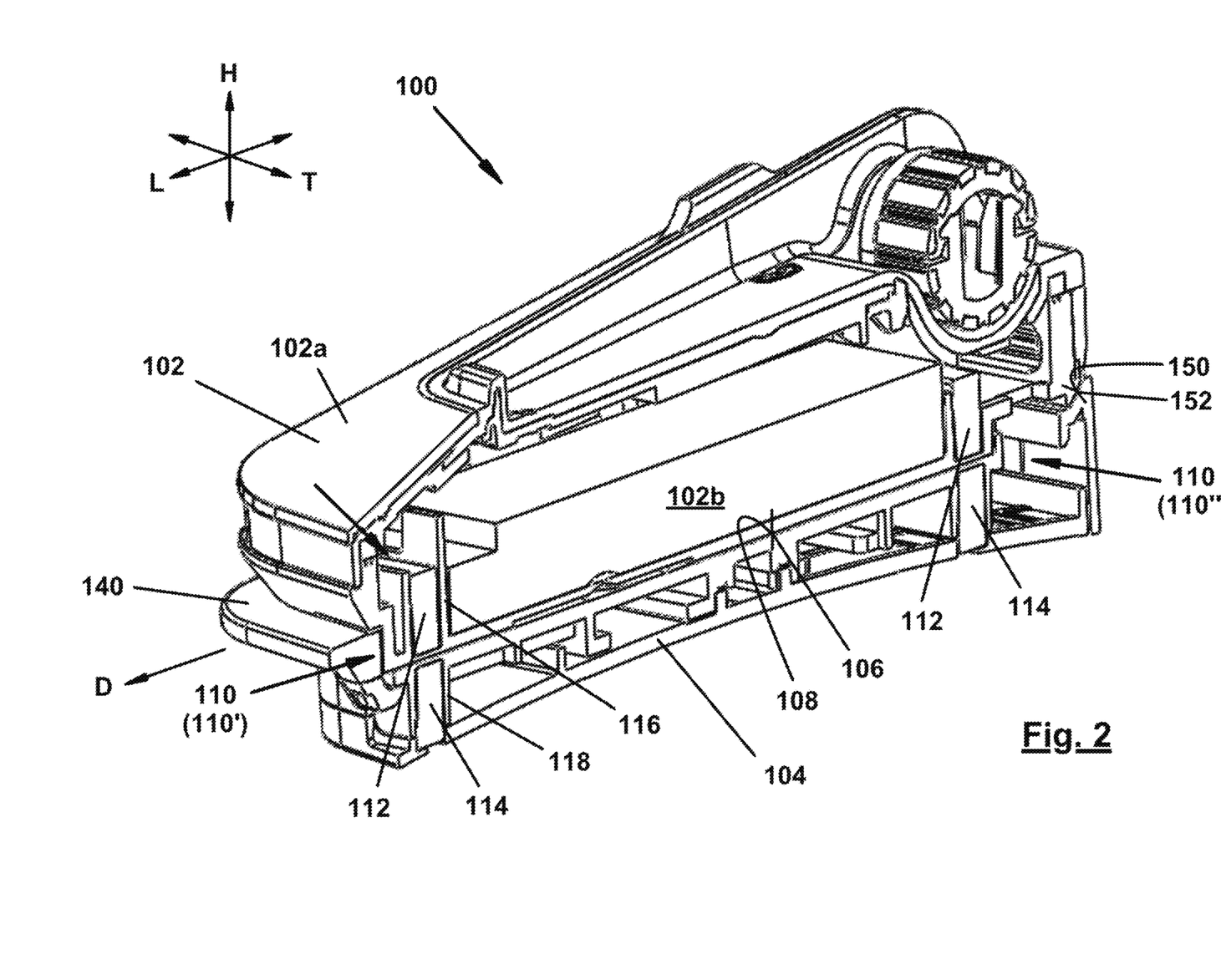
FIG. 2 shows a side cross-section view of the fastening device in a connected state.

In the embodiment shown in FIG. 2, the functional unit 102 comprises two pairs 110 of magnets 112, 114, namely a first pair 110' located in longitudinal direction L at the front end of a housing 102a of the functional unit 102, i.e. in front of a functional device 102b of the functional unit 102, and a second pair 110" located in longitudinal direction L at the rear end of the housing 102a, i.e. behind the functional device 102b. Based on this arrangement, the magnets' effect on the electrical components of the functional device 102b, in particular the capacitors thereof, and, in case of the functional device 102b including a communication device, the RF antenna(s) thereof, may be reduced.

Although in the present embodiment, the magnets 112, 114 of the at least one pair of magnets 110 both are permanent magnets, i.e. active magnets, it is to be noted that it is also conceivable that one of the magnets may be a passive magnet, i.e. a magnet having a magnetic field only due to being magnetized by an active magnet.

As may be seen from FIG. 1, the functional unit abutment surface 106 comprises at least one inclined functional unit abutment surface portion 106a, and the receiving unit abutment surface 108 comprises at least one inclined receiving unit abutment surface portion 108a. Said at least one inclined functional unit abutment surface portion 106a and said at least one inclined receiving unit abutment surface portion 108a extend at substantially the same inclination angle. As shown in FIG. 2, the at least one inclined functional unit abutment surface portion 106a and the at least one inclined receiving unit abutment surface portion 108a abut against each other in the connected state. As may be seen in FIG. 1, a plurality of inclined functional unit abutment surface portions 106a and a plurality of inclined receiving unit abutment surface portions 108a may be provided around the circumference of the functional unit 102 and the receiving unit 104, respectively.

As may be seen from FIG. 1, the receiving unit 104 further comprises electrical contacts 120 which are adapted and intended for being electrically connected to electrical counter-contacts (not shown) of the functional unit 102. As is per se known, these contacts 120 and counter-contacts in their connected state are intended for supplying commands input via an operating element 122 or signals derived from such commands to signal lines 124 and/or 126 connected to the receiving unit 104 and leading to at least one remote device (not shown).

In order to fasten the functional unit 102 to the receiving unit 104, the fastening device 100 comprises two mechanical locking units 130, one at each lateral side of the fastening device, and only one being shown in FIG. 1. Each mechanical locking unit 130 comprises a functional unit locking element 130a allocated to the functional unit 102 and a receiving unit locking element 130b allocated to the receiving unit 104.

Figure 3:
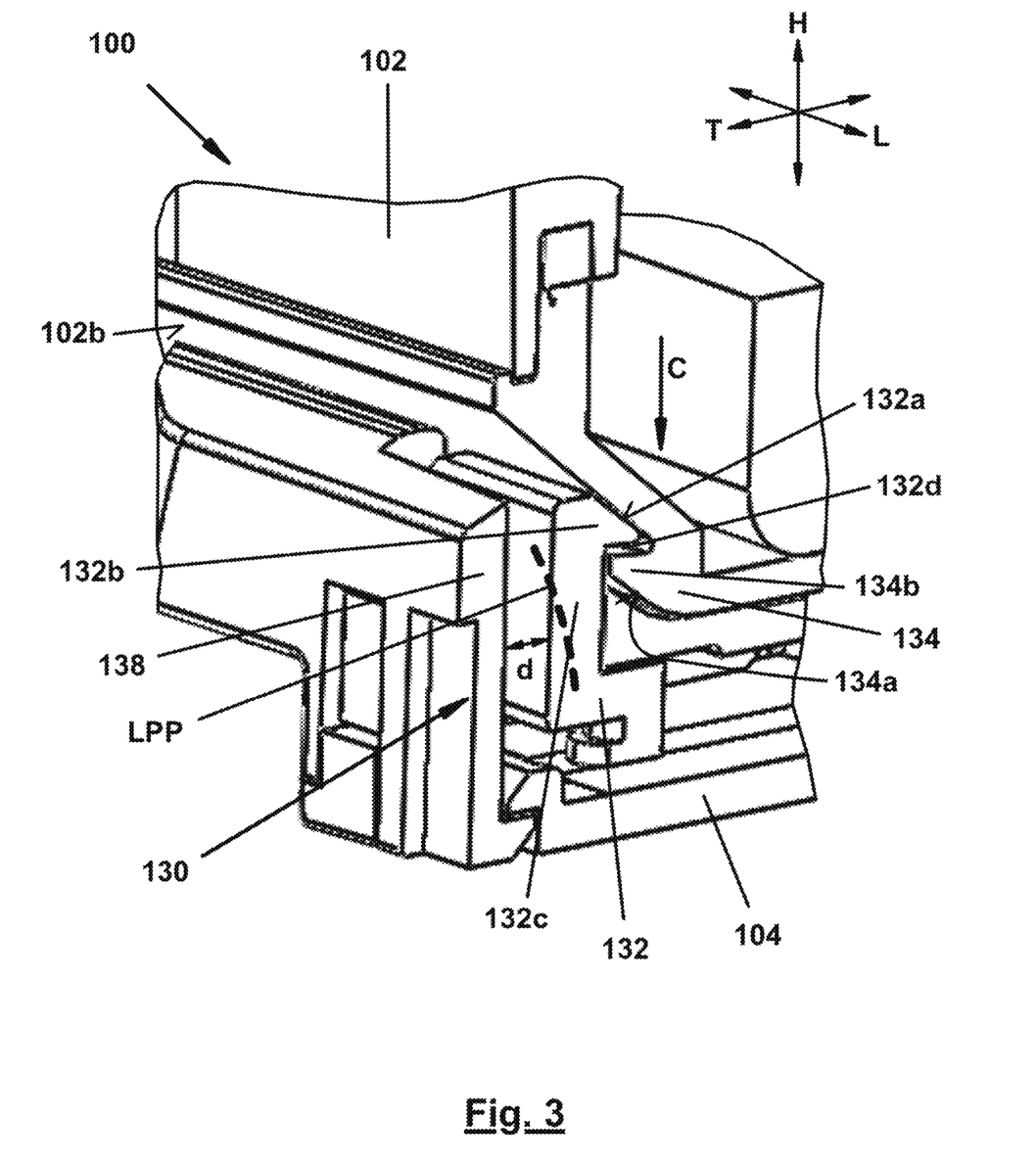
FIG. 3 shows a detailed view of a mechanical locking unit.

FIG. 3 is an enlarged cross-sectional view of the fastening device 100 cut along a plane spanned in transverse direction T and height direction H and shows the design of the mechanical locking unit 130 in more detail.

The mechanical locking unit 130 is designed as a snap-lock unit and comprises a catch element 132 and a trap element 134. The catch element 132 is provided with a catch sliding surface 132a and a catch end 132b. The trap element 134 is provided with a trap sliding surface 134a and a catch end 134b. Further, the functional unit 102 comprises a functional portion 102b extending laterally beyond the catch element 132.

The catch element 132 further comprises a resilient web 132c connecting the catch end 132b to the allocated unit, here the receiving unit 104. For preventing an overbending of the resilient web 132c, a backing wall element 138 is provided at a predetermined distance d from the connection of the resilient web 132c to the allocated unit, here the receiving unit 104.

For establishing the connected of the fastening device 100 shown in FIG. 2, the functional unit 102 is approached to the receiving unit 104 in the connection direction C. When approaching the functional unit 102 towards the receiving unit 104, the at least one pair of magnets 110 exerts an attractive force supporting the approaching and resulting in a self-centering effect of the two units 102, 104. This self-centering effect is enhanced by the cooperation of the at least one inclined functional unit surface portion 106a and the at least one inclined receiving unit surface portion 108a.

During the last phase of the approaching movement, the trap sliding surface 134a and the catch sliding surface 132a of the at least one mechanical locking unit 130 slide along each other and the catch end 134b of the catch element 134 is deflected to a locking preparation position LPP indicated by a dashed line in FIG. 3. This is enabled by the resilient web 132c being elastically deflected towards the backing wall element 138.

The catch sliding surface 132a and the trap sliding surface 134a slide along each other in connection direction C in a guided manner, until the trap end 132b passes the catch end 134b. As a consequence, the elastic deflection of the catch end 134b is reversed and the catch end 134b automatically returns to its undeflected position shown in FIG. 3. The catch element 134 and the trap element 132 engage with each other. In particular, the catch end 134b engages into the trap recess 132d. As a result, the functional unit 102 is locked to the receiving unit 104. This process is supported by the attractive force of the at least one pair of magnets 110.

The functional unit 102 and the receiving unit 104 are attached to each other in connection direction C by the attractive force exerted by the at least one pair of magnets 110 and the snap-lock engagement of the at least one mechanical locking unit 130.

As may be seen from FIGS. 1 and 2, the fastening device 100 further comprises a securing element 140 securing the functional unit 102 from being detached from the receiving unit 104 in a detaching direction D extending substantially parallel to the longitudinal direction L. FIGS. 1 and 2 show the securing element 140 in its securing position.

According to the embodiment shown, the securing element 140 is provided at and integrally formed with the receiving unit 104 (see FIG. 1). Formed in a U-shape, the securing element 140 extends partially around the receiving unit 104. The securing element 140 includes a connecting web 140a connects two side webs 140b. The connecting web 140a is extends substantially in transverse direction T, while the two side webs 140b extend substantially in longitudinal direction L, and are attached by their free ends to the receiving unit 104.

In the securing position of the securing element 140 (see FIG. 4), the connecting web 140a thereof blocks any movement of the functional unit 102 in the detaching direction D (see reference numeral BL).

Figure 4:
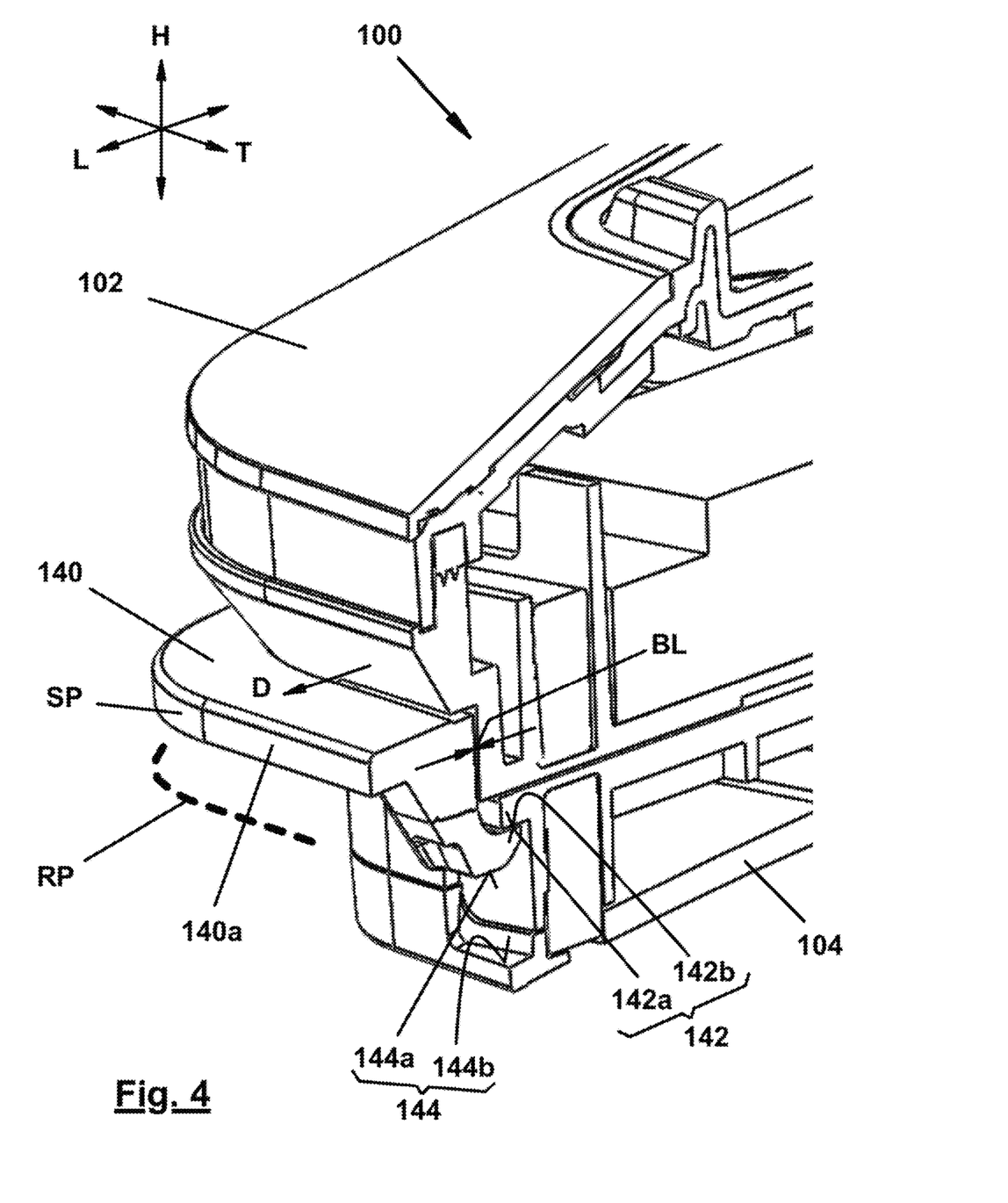
FIG. 4 shows a detailed view of a securing element of the fastening device.

In order to allow detachment of the functional unit 102 from the receiving unit 104 in said detaching direction D, the securing element 140 may be transferred from the securing position SP to a releasing position RP indicated by a dashed line in FIG. 4, in particular by deflecting its connecting web 140a downwards in the height direction H.

The securing position SP is defined by the cooperation of a movement limiting abutment surface 142a provided at the securing element 140 and a cooperating movement limiting abutment surface 142b provided at the receiving unit 104. The movement limiting abutment surface 142a and the cooperating movement limiting abutment surface 142b together form first movement limiting means 142. The first movement limiting means 142 prevent the securing element 140 from moving beyond the securing position SP.

In an analogous manner, the releasing position RP is defined by the cooperation of a further movement limiting abutment surface 144a provided at the securing element 140 and a further cooperating movement limiting abutment surface 144b provided at the receiving unit 104. The further movement limiting abutment surface 144a and the further cooperating movement limiting abutment surface 144b together form second movement limiting means 144. The second movement limiting means 144 prevent the securing element 140 from moving beyond the releasing position RP.

While the securing element 140 in its securing position SP prevents a movement of the functional unit 102 relative to the receiving unit 104 in the detaching direction D, a stopper surface 150 (see FIG. 1) provided at the receiving unit 104 and a stopper counter-surface 152 provided at the functional unit 102 prevent a relative movement in a direction opposite to the detaching direction D. The stopper surface 150 and the stopper counter surface 152 abut against each other in the connected state of the functional unit 102 and the receiving unit 104 (see FIG. 2).

The invention claimed is:

1. A fastening device for releasably fastening a functional unit in a connection direction to a receiving unit, comprising:

a functional unit comprising a functional unit abutment surface, wherein the functional unit comprises a housing and a functional device within the housing;

a receiving unit comprising a receiving unit abutment surface;

wherein the functional unit abutment surface and the receiving unit abutment surface are configured to abut against each other in a connected state; and at least two pairs of magnets comprising:
  at least a first functional unit magnet and a second functional unit magnet allocated at or within a proximity to the functional unit abutment surface, and
  at least a second receiving unit magnet a second receiving unit magnet allocated at or within a proximity to the receiving unit abutment surface,
  wherein the first functional unit magnet and the first receiving unit magnet exert an attractive force to each other and the second functional unit magnet and the second receiving unit magnet exert an attractive force to each other.

2. The fastening device of claim 1, wherein at least one of the first functional unit magnet or the first receiving unit magnet is an active magnet.

3. The fastening device of claim 2, wherein the active magnet comprises a permanent magnet or an electromagnet.

4. The fastening device of claim 1, wherein a position of the first functional unit magnet and a position of the first receiving unit magnet in the connected state when viewed in a connection direction are at least partially overlapping.

5. The fastening device of claim 4, wherein the position of the first functional unit magnet and the position of the first receiving unit magnet in the connected state when viewed in the connection direction are substantially aligned to each other.

6. The fastening device of claim 1,
wherein the functional unit abutment surface comprises at least one inclined functional unit abutment surface portion,
wherein the receiving unit abutment surface comprises at least one inclined receiving unit abutment surface portion, and
wherein, in the connected state, the at least one inclined receiving unit abutment surface portion is at least partially aligned to the at least one inclined functional unit abutment surface portion to facilitate a correct positioning of the functional unit relative to the receiving unit.

7. The fastening device of claim 1, wherein the fastening device further comprises at least one mechanical locking unit, the at least one mechanical locking unit comprising:
  a functional unit locking element allocated to the functional unit; and
  a receiving unit locking element allocated to the receiving unit, wherein the functional unit locking element and the receiving unit locking element are configured to cooperate with each other.

8. The fastening device of claim 1, further comprising at least one mechanical locking unit at each lateral side of the functional unit and the receiving unit.

9. The fastening device of claim 1, wherein the functional unit comprises a communication device.

10. The fastening device of claim 1, wherein the receiving unit is part of a head protection gear or formed as a separate unit operatively fixable to the head protection gear.

11. The fastening device of claim 1, wherein the at least two pairs of magnets are located outside the functional device at opposite sides of the functional device when viewed in a longitudinal direction or in a transverse direction.

12. A fastening device for releasably fastening a functional unit in a connection direction to a receiving unit, comprising:
  a functional unit comprising a functional unit abutment surface;
  a receiving unit comprising a receiving unit abutment surface, wherein the functional unit abutment surface and the receiving unit abutment surface are configured to abut against each other in a connected state;
  at least one pair of magnets comprising:
    at least one functional unit magnet allocated at or within a proximity to the functional unit abutment surface, and
    at least one receiving unit magnet being allocated at or within a proximity to the receiving unit abutment surface, wherein the at least one functional unit magnet and the at least one receiving unit magnet of the at least one pair of magnets exert an attractive force to each other; and
  a snap-lock unit, the snap-lock unit comprising at least one catch element allocated to one of the functional unit or the receiving unit and at least one trap element allocated to the other of the functional unit or the receiving unit, wherein the catch element and the trap element are configured to cooperate with each other.

13. The fastening device of claim 12,
wherein the at least one trap element comprises a trap sliding surface,
wherein the at least one catch element comprises a catch sliding surface, and
wherein the trap sliding surface and the catch sliding surface, when sliding along each other, elastically deflect a catch end of the at least one catch element to a locking preparation position.

14. The fastening device of claim 12, wherein the at least one catch element comprises a resilient web connecting a catch end to a respectively allocated unit, the respectively allocated unit comprising the receiving unit or the functional unit.

15. The fastening device of claim 14, further comprising a backing wall element extending substantially parallel to the resilient web at a predetermined distance from the connection of the resilient web to the respectively allocated unit.

16. The fastening device of claim 12, wherein the functional unit extends externally beyond the at least one catch element.

17. A fastening device, for releasably fastening a functional unit in a connection direction to a receiving unit, comprising:
  a functional unit comprising a functional unit abutment surface;
  a receiving unit comprising a receiving unit abutment surface, wherein the functional unit abutment surface and the receiving unit abutment surface are configured to abut against each other in a connected state;
  at least one pair of magnets comprising:
    at least one functional unit magnet allocated at or within a proximity to the functional unit abutment surface, and
    at least one receiving unit magnet allocated at or within a proximity to the receiving unit abutment surface, wherein the at least one functional unit magnet and the at least one receiving unit magnet exert an attractive force to each other; and a securing element transferable between a securing position and a releasing position, wherein the securing element is configured to prevent, in a securing position of the securing element, a movement of the functional unit relative to the receiving unit in a detaching direction, while allowing, in a releasing position of the securing element, the movement.

18. The fastening device of claim 17, wherein the securing element is provided at an allocated unit of the securing element, wherein the allocated unit of the securing element comprises the receiving unit or the functional unit.

19. The fastening device of claim 17, wherein the securing element is formed in a U-shape.

20. The fastening device of claim 17, wherein the fastening device further comprises one or more of:
   first movement limiting means configured to prevent the securing element from being moved beyond the securing position; or
   second movement limiting means configured to prevent the securing element from being moved beyond the releasing position.

21. A fastening device for releasably fastening a functional unit in a connection direction to a receiving unit, comprising:
   a functional unit comprising a functional unit abutment surface;
   a receiving unit comprising a receiving unit abutment surface, wherein the functional unit abutment surface and the receiving unit abutment surface are configured to abut against each other in a connected state;
   at least one pair of magnets comprising:
      at least one functional unit magnet allocated at or within a proximity to the functional unit abutment surface, and
      at least one receiving unit magnet allocated at or within a proximity to the receiving unit abutment surface, wherein the at least one functional unit magnet and the at least one receiving unit magnet exert an attractive force to each other; and
   a stopper surface provided at the receiving unit and a stopper counter-surface provided at the functional unit adapted and intended to cooperate with the stopper surface to limit a movement of the functional unit relative to the receiving unit in a direction opposite to a detaching direction.

22. A head protective gear with a fastening device comprising:
   a head protective gear;
   a fastening device comprising:
      a functional unit comprising a functional unit abutment surface, wherein the functional unit comprises a housing and a functional device within the housing; and
      a receiving unit forming part of or affixed to the head protection gear and comprising a receiving unit abutment surface, wherein the functional unit abutment surface and the receiving unit abutment surface are configured to abut against each other in a connected state; and
      at least two pairs of magnets comprising:
         a first functional unit magnet and a second functional unit magnet allocated at or within a proximity to the functional unit abutment surface; and
         a first receiving unit magnet and a second receiving unit magnet allocated at or within a proximity to the receiving unit abutment surface,
      wherein the first functional unit magnet and the first receiving unit magnet exert an attractive force to each other in the connected state and the second functional unit magnet and the second receiving unit magnet exert an attractive force to each other in the connected state.

* * * * *